(12) United States Patent
Joseph et al.

(10) Patent No.: US 6,696,153 B1
(45) Date of Patent: Feb. 24, 2004

(54) ADHESIVE COMPOSITION FOR TEXTILE/RUBBER ADHESIVE BONDING, AND TIRE COMPRISING A TEXTILE/RUBBER COMPOSITE

(75) Inventors: Aurélie Joseph, Chamalieres (FR); Michelle Chassagny, Orcines (FR); Marius Roux, Cebazat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1 day.

(21) Appl. No.: 09/969,753

(22) Filed: Oct. 3, 2001

Related U.S. Application Data

(63) Continuation of application No. PCT/EP01/00993, filed on Jan. 31, 2001.

(30) Foreign Application Priority Data

Feb. 3, 2000 (FR) .............................................. 00 01398

(51) Int. Cl.$^7$ ................................................. D02G 3/00
(52) U.S. Cl. ....................... 428/365; 428/378; 428/359; 428/364; 428/295.1; 525/133
(58) Field of Search ................................ 428/378, 375, 428/359, 364, 365, 295.1; 525/133, 142, 139

(56) References Cited

U.S. PATENT DOCUMENTS

| | | | | |
|---|---|---|---|---|
| 4,469,748 A | * | 9/1984 | Sharma | 428/378 |
| 5,411,638 A | | 5/1995 | Bernard et al. | |
| 5,837,045 A | * | 11/1998 | Johnson et al. | 106/31.88 |

FOREIGN PATENT DOCUMENTS

| | | |
|---|---|---|
| EP | 289552 | 6/1991 |
| GB | 460557 | 6/1936 |
| WO | 8803483 | 5/1988 |
| WO | 9212285 | 7/1992 |

* cited by examiner

*Primary Examiner*—Merrick Dixon
(74) *Attorney, Agent, or Firm*—Baker Botts LLP

(57) ABSTRACT

An adhesive composition that can be used to bond textile fibers adhesively to a cross-linkable rubber composition, textile fibers sized by means of the said adhesive composition, a composite of the textile fibers and a cross-linked rubber composition that is permeable to light, and a tire body whose sidewalls are made from the composite are disclosed. The adhesive composition is made from an aqueous thermosetting phenolic adhesive containing at least one diene elastomer and at least one organic pigment. This adhesive composition is the reaction product the aqueous thermosetting phenolic adhesive and an aqueous pigmentary dispersion containing the organic pigment.

3 Claims, No Drawings

ADHESIVE COMPOSITION FOR TEXTILE/RUBBER ADHESIVE BONDING, AND TIRE COMPRISING A TEXTILE/RUBBER COMPOSITE

The present application is a continuation of PCT/EP01/00993 filed Jan. 31, 2001, now WO 01/57116 A1.

BACKGROUND OF THE INVENTION

The present invention concerns an adhesive composition that can be used to bond textile fibers adhesively to a cross-linkable rubber composition. The invention also relates to textile fibers sized by means of the adhesive composition, a composite comprising the sized textile fibers and a cross-linked rubber composition that is permeable to light, and a tire body whose sidewalls comprise the composite.

The coloring of textile cables to make them visible through the sidewalls of a tire, in particular a bicycle tire, is well known. This expedient is adopted in order to enhance the appearance of the sidewalls by exposing to view the structure of textile cables provided radially inside a cross-linked rubber composition which is transparent or translucent, so that the cables can be seen through the rubber composition.

For example, British Patent GB-A-460 557 discloses a bicycle tire that comprises, a textile ply, over which a solution of liquid rubber containing a colorant is applied (column 1, lines 23–37) and, over this solution, a layer of transparent rubber is applied.

Also, International Patent application WO-A-88/3 483, discloses a bicycle tire whose sidewalls comprise a textile ply coated with a transparent elastomer. This textile ply displays a color shade which defines a background color for the sidewalls. In addition, decorative patterns whose color(s) differ(s) from that of the textile ply are incorporated in it.

To cause a textile fiber to adhere to a cross-linkable rubber composition, it is known that the fiber is first immersed in a sizing bath and the sized fiber is then dried and subjected to appropriate heat treatment. Before immersing in the sizing bath, the fiber is sometimes immersed in a preliminary bath based on epoxy resin in order to improve the quality of the subsequent bonding between the sized fiber and the rubber composition in the cross-linked state.

The sizing bath generally contains an aqueous thermosetting phenolic adhesive comprising at least one diene elastomer. For adhesive bonding of rubber compositions to textile cables, such as those usually used in tires, the adhesive employed most often is that known as "RFL adhesive" (resorcinol formaldehyde latex).

This RFL adhesive thus comprises an aqueous thermosetting phenolic resin and an elastomer matrix.

More precisely, the thermosetting phenolic resin comprises resorcinol (or a resorcinol/formol precondensate), formol and sodium hydroxide in the aqueous phase.

The elastomer matrix comprises one or more diene elastomers, such as natural rubber, which may be blended with a styrene/butadiene copolymer and/or a vinylpyridine/styrene/butadiene terpolymer.

Ammonia or sodium hydroxide are also added to obtain the RFL adhesive. In some cases the adhesive may also contain block isocyanates.

Experience has shown that the phenolic resin confers upon this adhesive a satisfactory adhesion between cables of textile fibers and the cross-linkable rubber composition.

However, a disadvantage of this RFL-type adhesive emerges when it has been used to attach cables of textile fibers to a cross-linked rubber composition that is permeable to light, such that the cables can be seen through the rubber composition.

In effect, RFL-type adhesives are particularly characterized by red or orange-red colors conferred upon them by the thermosetting phenolic resins. Such colors or color tints are not always desirable from an aesthetic standpoint for a favorable exposure to sight of the textile cables within the sidewalls.

Japanese patent application JP-A-60/199 982 presents a process for sizing and coloring textile cables, whose purpose is to confer upon the adhesively bonded cables light tints in place of the deep colors inherent in RFL adhesives, along with satisfactory adhesion to a rubber composition chosen to be essentially transparent so as to expose the colored cables to view.

A sizing solution is first prepared by mixing while stirring slowly:

100 parts by weight of an aqueous dispersion of latex and a condensation product of resorcin-formaldehyde (RFL), with a solution containing 10 to 50 parts by weight of an ethylene-urea compound (more precisely, 4,4'-diphenylmethanebisethylene-urea), and then adding to the mixture so obtained a non-aqueous dye in an amount ranging from 3 to 30 parts by weight, while stirring continues.

The textile cables are then immersed in the sizing and coloring solution, the sized cables are dried, and they then undergo a specific heat treatment at a temperature which depends on the quantity of the ethylene-urea compound used in the sizing and coloring solution.

The presence of the ethylene-urea compound in the solution is essential to confer a clear color upon the cables and satisfactory adhesion to the rubber composition bonded to the cables, since the presence of pure pigment alone in the solution does not enable this light color (i.e. a color other than the red, orange-red or brown-red of the RFL adhesive) to be obtained.

However, a major disadvantage of this sizing and coloring operation is the higher operating cost incurred by the use of the additional ethylene-urea compound in the sizing solution.

Japanese Patent application JP-A-60/139 876 also provides a process for sizing and coloring textile cables with a view to bonding them to an essentially transparent rubber composition. The process involves mixing a non-aqueous colorant with a sizing solution of the RFL type and using a sequenced polyisocyanate as an agent to promote adhesion to the rubber composition.

SUMMARY OF THE INVENTION

The purpose of the present invention is to overcome the above drawback concerning the use of an ethylene-urea compound to lighten the color of the RFL adhesive, without adverse effect upon the adhesion. The present invention is based on the surprising discovery that an aqueous pigment dispersion comprising at least one organic pigment can be used in an adhesive composition that can be used to bond textile fibers adhesively to a cross-linkable rubber composition, wherein the adhesive composition is the reaction product of the aqueous pigmentary dispersion and an aqueous thermosetting phenolic adhesive which comprises at least one diene elastomer. The resulting adhesive composition has a light color different from the red or orange-red colors inherent in thermosetting formophenolic resins such as RFL resin, while having no adverse effect on the adhesion between the textile fibers and the cross-linkable rubber composition.

The presence of the pigment in the form of an aqueous dispersion in the adhesive composition eliminates the need for an additional compound to obtain the light color desired, since the adhesive composition contains no ethylene-urea compound. Moreover, the aqueous pigmentary dispersion has no adverse effect on the adhesion of the thermosetting phenolic adhesive.

DETAILED DESCRIPTION OF THE INVENTION

The organic pigments which can be used as the at least one organic pigment in the adhesive composition according to the invention have in common structural elements that confer upon the adhesive composition a durable color, in particular when the said rubber composition and the adhesive composition have been vulcanized with sulphur. In a non-limiting way, these common structural elements include at least one chromophoric group, such as a C=C, C=N, N=N, N=O or C=O radical, benzene rings or heterocycles, and at least one auxochromic group, such as an OH, $NH_2$, $NO_2$, $CH_3$, Cl or Br radical or a $SO_3Na$ group.

Additionally, the color that the pigmentary dispersion confers upon the adhesive composition according to the invention is preferably characterized in the visible range by a wavelength shorter (i.e. a higher frequency) than that of the color of the resin.

The mass fraction of pigment that can be used in the adhesive composition without adverse effect on the adhesion may vary depending on the nature of the pigment. This mass fraction is preferably less than or equal to 1%.

According to a particularly advantageous embodiment of the invention, the pigment belongs to the group consisting of the phthalocyanines and diarylides.

Copper phthalocyanine is an example of phthalocyanine pigments.

Such a pigment essentially has a green or blue color, and can confer on the adhesive composition containing it colors that range from green to blue through several possible shades, such as green-grey or green-blue.

Diarylide-m-xylidide is an example of diarylide pigments.

Such a pigment essentially has a yellow color and can confer on the adhesive composition containing it color shades of the orange-yellow type.

The process according to the invention used to prepare the adhesive composition comprises in mixing the aqueous thermosetting phenolic adhesive containing at least one diene elastomer with an aqueous pigmentary dispersion containing the organic pigment.

According to another aspect of the invention, the aqueous pigmentary dispersion used in preparing the adhesive composition contains the pigment in a mass fraction of less than or equal to 10%.

Moreover, the aqueous pigmentary dispersion is introduced into the adhesive composition in a mass fraction less than or equal to 15%. In addition, the aqueous pigmentary dispersion contains water in a mass fraction between 40% and 60%.

An adhesive composition according to the invention may comprise a thermosetting phenolic adhesive other than RFL adhesive. This thermosetting phenolic adhesive may contain diene elastomers other than vinylpyridine, a styrene-butadiene copolymer and natural rubber.

A textile fiber bonded according to the invention is coated with an adhesive composition such as the above.

Examples of textile fibers include polyamide fibers, such as Nylon®, aramid fibers, polyester fibers, such as polyethylene terephthalate (PET), or even a cellulose material, such as rayon.

A composite according to the invention comprises a rubber composition in the cross-linked condition which is permeable to visible light (i.e. transparent or translucent) that is bonded to textile fibers, wherein the composite comprises an adhesive composition as described above between the rubber composition and the textile fibers.

In an embodiment of a composite according to the invention, the rubber composition comprises a blend of natural rubber and at least one other diene elastomer, wherein the natural rubber is the major proportion of elastomers in the blend, and a reinforcing filler based on carbon black.

As used herein, the term diene elastomer means an elastomer obtained at least in part (i.e., a homopolymer or copolymer) from diene monomers (monomers having two carbon-carbon double bonds, whether conjugated or not). Preferably, the diene elastomer is essentially unsaturated, i.e., it is obtained at least in part from conjugated diene monomers having a proportion of elements or units of diene origin (conjugated dienes) greater than 15% (% in moles).

A tire body according to the invention is one which has sidewalls comprising the composite.

Advantageously, the tire body is intended for use with a two-wheeled vehicle such as a bicycle. The adhesive composition of the invention provided between the light-permeable rubber composition and the textile fibers, usually in the form of cables, enables the cables to be exposed to view while conferring upon them colors or color shades which are particularly selected for their aesthetic appearance (for example an orange-yellow tint to the blue color in the spectrum of visible light, passing through green).

The aforesaid characteristics of the present invention, as well as others, will be better understood on reading the description of several non-limiting embodiments of the present invention.

Three series of aqueous adhesive compositions according to the invention were prepared.

The adhesive compositions of the series each comprise the same aqueous thermosetting phenolic adhesive, an RFL adhesive. This adhesive was prepared in a known way from a resorcinol-base resin (referred to for brevity as "resin" in the remainder of this description).

The formulation of the adhesive is as follows:

| Adhesive: | vinylpyridine (VP) | 10. g |
|---|---|---|
| | styrene/butadiene copolymer (SBR) | 8. g |
| | natural rubber (NR) | 5. g |
| | ammonia | 1.5 g |
| | resin | 16. g |
| | water | 59.5 g |
| in which, the resin is: | resorcinol | 9. g |
| | 49% sodium hydroxide | 0.5 g |
| | 31% formol | 16.5 g |
| | water | 74. g |

The adhesive was prepared, allowing 4 hours for the resinification stage and 12 hours for the maturation stage of the adhesive.

The adhesive compositions of the first test series according to the invention additionally comprise an aqueous pigmentary dispersion marketed by ZENECA under the name "VERT MONASTRAL GNE HD PÂTE" [MONASTRAL GREEN GNE HD PASTE]. This dispersion is characterized by a dry content mass fraction of 49.5% and comprises a chlorine-saturated copper phthalocyanine pigment having 14 chlorine atoms per molecule. More precisely, the pigment is present in the aqueous pigmentary dispersion in a mass fraction of 2.3%.

The adhesive compositions of the second test series according to the invention additionally comprise an aqueous pigmentary dispersion marketed by CIBA Spécialités Chimiques S. A. under the name "BLEU UNISPERSE B-PI" [UNISPERSE BLUE B-PI]. This dispersion is characterized by a dry content mass fraction of 49.5% and contains a copper alphaphthalocyanine pigment. More precisely, the pigment is present in the dispersion in a mass fraction of 6.3%.

The adhesive compositions of the third test series according to the invention additionally comprise an aqueous pigmentary dispersion marketed by CIBA Specialites Chimiques S. A. under the name "JAUNE [YELLOW] UNISPERSE B-PI, C.I. Pigment Yellow 13-21100". This dispersion is characterized by a dry content mass fraction of 49.5% and contains a diarylide pigment, namely diarylide-m-xylidide. More precisely, the pigment is present in the dispersion in a mass fraction of 0.7%.

The adhesive compositions of each of these test series differ from one another only in the quantity of aqueous pigmentary dispersion that they contain (i.e. in the mass fractions of the aqueous pigmentary dispersions in the corresponding adhesive compositions).

The following fibers to be bonded by the adhesive compositions were used:

Cables comprising 6-6 polyamide fibers marketed under the designation "140/2 T728" by DUPONT were used with the first and third series, and cables comprising of 6-6 polyamide fibers marketed under the designation "47/1 Z220-NT120" by SOVOUTRI were used with the second series.

The cables in each of the said series were sized by immersion in a sizing bath comprising the corresponding adhesive composition and then dried at 220° C. for 15 seconds. The sized cables were then heat treated at 220° C. for 15 seconds.

For each of the test series, each cable variant sized and heat treated as above was integrated into a cross-linkable rubber composition in order to determine, once the composition had been vulcanized, what tear-out forces would be needed to extract each cable from the composition.

The formulation of the rubber composition is given in Table 1 below (values expressed in phr, parts by weight per one-hundred parts of the elastomer(s)):

TABLE 1

| Composition | phr |
|---|---|
| natural rubber | 55 |
| polybutadiene | 20 |
| styrene/butadiene copolymers | 25 |
| carbon black | 42 |
| zinc oxide | 3 |
| stearic acid | 1 |
| tackiness-promoting resin | 2 |
| anti-oxidation agent | 1.4 |
| oil | 15 |
| sulphur | 2 |
| vulcanization accelerator | 0.9 |

The tear-out forces were measured using an adhesion test described in the International Patent application WO-A-92/12285, at pages 8 and 9.

The measurement testpiece comprised 12 loops embedded at both ends in a block of vulcanized rubber consisting of the rubber composition in the cross-linked state. The testpiece was prepared in a mold and vulcanized for 15 minutes at 160° C., under a pressure of $15.10^{-5}$ Pa. The axial force at 20° C. required to extract each cable from the said rubber composition was measured.

The adhesion results are presented in Tables 2 to 4 below, which refer respectively to the three aforesaid test series.

In addition, calorimetric measurements were carried out for the adhesive compositions of each test series, using a "Dataflash 100" spectrocolorimeter marketed by Datacolor. In the tests a "65" illuminator, an observation tube at an angle of 10°, "d/8" geometry, and a "CIELAB" coordinate system were used.

Tables 2 to 4 below also show the colorimetric results, which include values that represent the mean luminosity (L* mean) and the axes of colors (a* mean and b* mean).

TABLE 2

First series of seven tests 1b to 1h according to the invention, compared with a "reference" test 1a:

| Adhesive compositions | 1a | 1b | 1c | 1d | 1e | 1f | 1g | 1h |
|---|---|---|---|---|---|---|---|---|
| VP (g) | 10 | 10 | 10 | 10 | 10 | 10 | 10 | 10 |
| SBR (g) | 8 | 8 | 8 | 8 | 8 | 8 | 8 | 8 |
| NR (g) | 5 | 5 | 5 | 5 | 5 | 5 | 5 | 5 |
| ammonia (g) | 1.5 | 1.5 | 1.5 | 1.5 | 1.5 | 1.5 | 1.5 | 1.5 |
| resin (g) | 16 | 16 | 16 | 16 | 16 | 16 | 16 | 16 |
| water | 59.5 | 59.5 | 59.5 | 59.5 | 59.5 | 59.5 | 59.5 | 59.5 |
| pigmentary dispersion <<Vert Monastral>> [Monastral Green] (g) | 0 | 0.2 | 0.4 | 0.8 | 1.2 | 1.6 | 2 | 4 |
| pure pigment (g) | 0 | 0.0046 | 0.0092 | 0.0184 | 0.0276 | 0.0368 | 0.046 | 0.092 |
| adhesion of the cables at | 71 | 69 | 75 | 75 | 74 | 78 | 72 | 68 |

TABLE 2-continued

First series of seven tests 1b to 1h according to the invention, compared with a "reference" test 1a:

| Adhesive compositions | 1a | 1b | 1c | 1d | 1e | 1f | 1g | 1h |
|---|---|---|---|---|---|---|---|---|
| 20° C. (N/strand) color of the adhesive composition | orange | greenish | green | green | green | green | green | green |
| L* mean | 43.8 | 38.1 | 36.6 | 32.9 | 30.9 | 30.1 | 29.5 | 27.3 |
| a* mean | 23.3 | 3.3 | −4.6 | −10.5 | −12.8 | −14.1 | −15.3 | −16.2 |
| b* mean | 26.8 | 16.8 | 14.1 | 10.6 | 8.8 | 7.9 | 7.1 | 4.8 |

It will be noted that the color of the adhesive compositions tested evolves essentially from orange to green, without adverse effect on the adhesion between the bonded cables and the cross-linked rubber composition (relative to the "reference" test 1a a without any dispersion).

TABLE 3

Second series of seven tests 2b to 2h according to the invention, compared with a "reference" test 2a:

| Adhesive compositions | 2a | 2b | 2c | 2d | 2e | 2f | 2g | 2h |
|---|---|---|---|---|---|---|---|---|
| VP (g) | 10 | 10 | 10 | 10 | 10 | 10 | 10 | 10 |
| SBR (g) | 8 | 8 | 8 | 8 | 8 | 8 | 8 | 8 |
| NR (g) | 5 | 5 | 5 | 5 | 5 | 5 | 5 | 5 |
| ammonia (g) | 1.5 | 1.5 | 1.5 | 1.5 | 1.5 | 1.5 | 1.5 | 1.5 |
| resin (g) | 16 | 16 | 16 | 16 | 16 | 16 | 16 | 16 |
| water (g) | 59.5 | 59.5 | 59.5 | 59.5 | 59.5 | 59.5 | 59.5 | 59.5 |
| pigmentary dispersion <<Bleu Unisperse>> [Unisperse Blue] (g) | 0 | 0.4 | 0.8 | 1.6 | 2.0 | 4.0 | 8.0 | 12 |
| pure pigment (g) | 0 | 0.0252 | 0.0504 | 0.10 | 0.126 | 0.252 | 0.504 | 0.756 |
| adhesion of the cables at 20° C. (N/strand) | 24 | 25 | 25 | 25 | 24 | 24 | 24 | 21 |
| color of the adhesive composition | red | green-grey | green-grey | green-blue | green-blue | green-blue | green-blue | green-blue |
| L* mean | 50.3 | 38.2 | 36.3 | 33.1 | 33 | 25.4 | 22.8 | 21.3 |
| a* mean | 19.7 | −0.1 | −3.7 | −7.9 | −8.7 | −8.7 | −5.3 | −2.7 |
| b* mean | 23.5 | 6.4 | 1.9 | −4.8 | −6.4 | −11.1 | −14 | −14.4 |

It will be noted that the color of the adhesive compositions tested evolves essentially from red to green-blue, without adverse effect on the adhesion between the bonded cables and the cross-linked rubber composition (relative to the "reference" test 2a without any dispersion).

TABLE 4

Third series of seven tests 3b to 3h according to the invention, compared with a "reference" test 3a:

| Adhesive compositions | 3a | 3b | 3c | 3d | 3e |
|---|---|---|---|---|---|
| VP (g) | 10 | 10 | 10 | 10 | 10 |
| SBR (g) | 8 | 8 | 8 | 8 | 8 |
| NR (g) | 5 | 5 | 5 | 5 | 5 |
| ammonia (g) | 1,5 | 1,5 | 1,5 | 1,5 | 1,5 |
| resin (g) | 16 | 16 | 16 | 16 | 16 |
| water (g) | 59,5 | 59,5 | 59,5 | 59,5 | 59,5 |
| pigmentary dispersion <<Jaune Unisperse>> [Unisperse Yellow] (g) | 0 | 1 | 2 | 4 | 8 |
| pure pigment (g) | 0 | 0,007 | 0,014 | 0,028 | 0,056 |
| adhesion of the cables at 20° C. (N/strand) | 80 | 78 | 78 | 79 | 76 |
| color of the adhesive composition | orange | orange | orange | orange-yellow | orange-yellow |
| L* mean | 44,2 | 46,4 | 46,9 | 46 | 46,3 |
| a* mean | 23,8 | 23,8 | 24,1 | 25 | 25,1 |
| b* mean | 25,1 | 36,1 | 35,7 | 42 | 44,1 |

It will be noted that the color of the adhesive compositions tested evolves essentially from orange to orange-yellow without adverse effect on the adhesion between the bonded cables and the cross-linked rubber composition (relative to the "reference" test 3a without any dispersion).

We claim:

1. An adhesive composition for bonding textile fibers adhesively to a cross-linkable rubber composition, comprising an aqueous thermosetting phenolic adhesive containing at least one diene elastomer and an organic pigment, wherein the adhesive composition is a reaction product of the aque ous thermosetting phenolic adhesive and an aqueous pigmentary dispersion comprising the organic pigment, wherein the mass fraction of the pigment in the adhesive composition is less than 1%.

2. The adhesive composition according to claim 1 wherein the pigment is selected from the group consisting of phthalocyanines and diarylides.

3. The adhesive composition according to claim 1, wherein the adhesive composition does not contain an ethylene-urea compound.

* * * * *